(12) United States Patent
Matsuoka

(10) Patent No.: US 7,444,217 B2
(45) Date of Patent: Oct. 28, 2008

(54) ELECTRIC POWER STEERING SYSTEM

(75) Inventor: Yuuki Matsuoka, Nara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 470 days.

(21) Appl. No.: 11/326,329

(22) Filed: Jan. 6, 2006

(65) Prior Publication Data

US 2006/0184298 A1     Aug. 17, 2006

(30) Foreign Application Priority Data

Jan. 6, 2005     (JP)     ............... P2005-001928

(51) Int. Cl.
  *B62D 5/04*     (2006.01)
  *G01L 3/10*     (2006.01)
(52) U.S. Cl. .......................... 701/34; 701/41
(58) Field of Classification Search ............ None
  See application file for complete search history.

(56) References Cited

U.S. PATENT DOCUMENTS

| | | | | |
|---|---|---|---|---|
| 4,972,320 A | * | 11/1990 | Sugiura et al. | 701/43 |
| 6,240,349 B1 | * | 5/2001 | Nishimoto et al. | 701/41 |
| 7,228,249 B2 | * | 6/2007 | Hartrey | 702/116 |
| 2002/0120378 A1 | * | 8/2002 | Kawada et al. | 701/41 |

FOREIGN PATENT DOCUMENTS

| | | |
|---|---|---|
| EP | 1 466 812 A2 | 10/2004 |
| JP | 63-162370 | 5/1988 |
| JP | 3-121974 | 5/1991 |
| JP | 7-329803 | 12/1995 |
| JP | 10-258752 | 9/1998 |
| JP | 10-324254 | 12/1998 |
| JP | 2000-280927 | 10/2000 |
| JP | 2002-347635 | 12/2002 |

* cited by examiner

*Primary Examiner*—Michael J. Zanelli
(74) *Attorney, Agent, or Firm*—McGinn IP Law Group, PLLC

(57) ABSTRACT

A configuration is provided in which detected torque values detected by a main torque sensor and a sub-torque sensor in such a state that a predetermined torque including zero is applied are captured, a calculation of a torque difference is repeated a plurality of number of times, an average value of an absolute value of a torque difference which is calculated each time is obtained, this average value is written to be stored in an EEPROM, and a threshold value used for the failure determination is corrected based on the stored value.

3 Claims, 4 Drawing Sheets

ELECTRIC POWER STEERING SYSTEM

BACKGROUND OF THE INVENTION

The present invention relates to an electric power steering system which assists steering by virtue of a rotating force of a motor which is controlled to be driven based on a result of a detection of a steering torque applied to a steering member.

In an electric power steering system in which a steering assist motor is driven in response to a rotating operation of a steering member such as a steering wheel, so that a rotating force of the motor is applied to a steering mechanism so as to assist steering, a steering torque that is applied to the steering member needs to be detected for use to control the drive of the steering assist motor, and conventionally, a torque sensor, which is provided at an intermediate position of a steering shaft which connects the steering member and the steering mechanism together, is used to detect the torque.

With the electric power steering system like this, there exists a problem that when the torque sensor is in a failed state, the application of a steering assist force by the motor which is controlled to be driven based an erroneous detected torque value detected by the failed torque sensor makes steering unstable. To cope with this, conventionally, two torque sensors having the same configuration are provided in parallel at the intermediate position of the steering shaft, and a detected torque value detected by one torque sensor (a main torque sensor) is used to control the drive of the steering assist motor, whereas a detected torque value detected by the other torque sensor (a sub-torque sensor) is used to determine on the failure of the main torque sensor, whereby when a difference between the detected torque values detected by both the torque sensors exceeds a preset threshold value, the main torque sensor is determined to be in a failed state, and the control of the drive of the steering assist motor (the assist control) is prohibited to thereby prevent the occurrence of unstable steering.

While the aforesaid failure determination is performed accurately when the detected torque values detected by the main and sub-torque sensors coincide relative to the same torque input, both the torque sensors inevitably suffer from a difference in characteristics which is attributed, for example, to dimension errors of constituent components, positioning errors at the time of assembly and the like. To cope with this, conventionally, after assembly, a predetermined torque is experimentally applied so as to obtain detected torque values by main and sub-torque sensors, and a difference between the two detected torque values is used as a threshold value for use in the failure determination so as to offset the characteristics difference to thereby attempt to increase the accuracy of the failure determination (refer, for example, to Patent Document No. 1).

Patent Document No. 1: JP-A-10-324254

In the assembly line where the above test is carried out, however, there exist many disturbance factors such as various types of noise which will affect detection, and hence, there exists a risk that the setting of a threshold value is erroneously carried out based on detected torque values which are obtained in the above environment, which deteriorates, on the contrary to the intention, the accuracy of a failure determination made based on the threshold value so set, whereby an erroneous assist control is implemented to trigger a reduction in steering stability.

In addition, the threshold value which is set as has been described above is generally written to be stored in a memory IC such as EEPROM which is provided in an assist controlling ECU and is read out of the ECU for use every time the ECU is activated in response to an ON operation of the ignition key. However, there may occur an error in writing or reading out the threshold value, and in this case, too, a failure determination is carried out based on the erroneous threshold value, leading to a risk that the reduction in steering stability is triggered.

SUMMARY OF THE INVENTION

The invention was made in these situations, and an object thereof is to provide an electric power steering system which enables the setting of as accurate a threshold value as possible even in the disturbance environment, which can eliminate an error in writing or reading out the set threshold value, and which enables the execution of an accurate failure determination based on the threshold value, so as to enable the execution a good assist control without triggering any reduction in steering stability.

According to a first aspect of the invention, there is provided an electric power steering system comprising:

primary and secondary torque sensors for detecting a steering torque applied to a steering member;

a difference calculator that calculates a difference between detected torque values detected by the primary and secondary torque sensors a predetermined number of times in such a state that a predetermined steering toque is applied;

an average value calculator that calculates an average value of results of calculations made by the difference calculator;

a threshold value corrector that corrects the threshold value based on the average value calculated by the average value calculator; and a failure determining unit that performs a failure determining operation for determining whether or not the primary torque sensor fails based on a result of a comparison between a difference between detected torque values detected by the primary and secondary torque sensors and the corrected threshold value is performed during an assist control operation in which a steering assist motor is controlled to be driven based on a detected torque value detected by the primary torque sensor.

In addition, according to a second aspect of the invention, there is provided an electric power steering system as set forth in the first aspect of the invention, comprising a storage device for storing average values calculated by the average value calculating device as a plurality of values which are written in different modes, whereby the threshold correcting device is designed to correct the threshold value based on a stored value read out of the storage.

In the electric power steering system according to the first aspect of the invention, since the difference between the detected torque values detected by the first and second torque sensors are calculated the predetermined number of times in such a state that the predetermined steering torque is applied, the average value of the calculated values is obtained and the threshold value is corrected using the average value, a difference generated by the disturbance is offset, and an actual difference generated between the detected torque values detected by the primary and secondary torque sensors can be obtained accurately, so that a highly accurate failure determination can be enabled by use of the threshold value which has been corrected based on the actual difference so obtained, whereby the reduction in steering stability due to the execution of the erroneous assist control can be prevented. Note that the predetermined steering toque includes zero.

In addition, in the electric power steering system according to the second aspect of the invention, since the calculated average values calculated by the average value calculating device are written to be stored in the different mode and are read out for use at the time of initiating a failure determination operation, the setting of an accurate threshold value is enabled from which writing and reading errors are eliminated, whereby the reduction in steering stability due to the execution of the erroneous assist control can be prevented in a more ensured fashion. Thus, the invention provides the superior advantages.

DETAILED DESCRIPTION OF PREFERRED EMBODIMENTS

Figure 1:
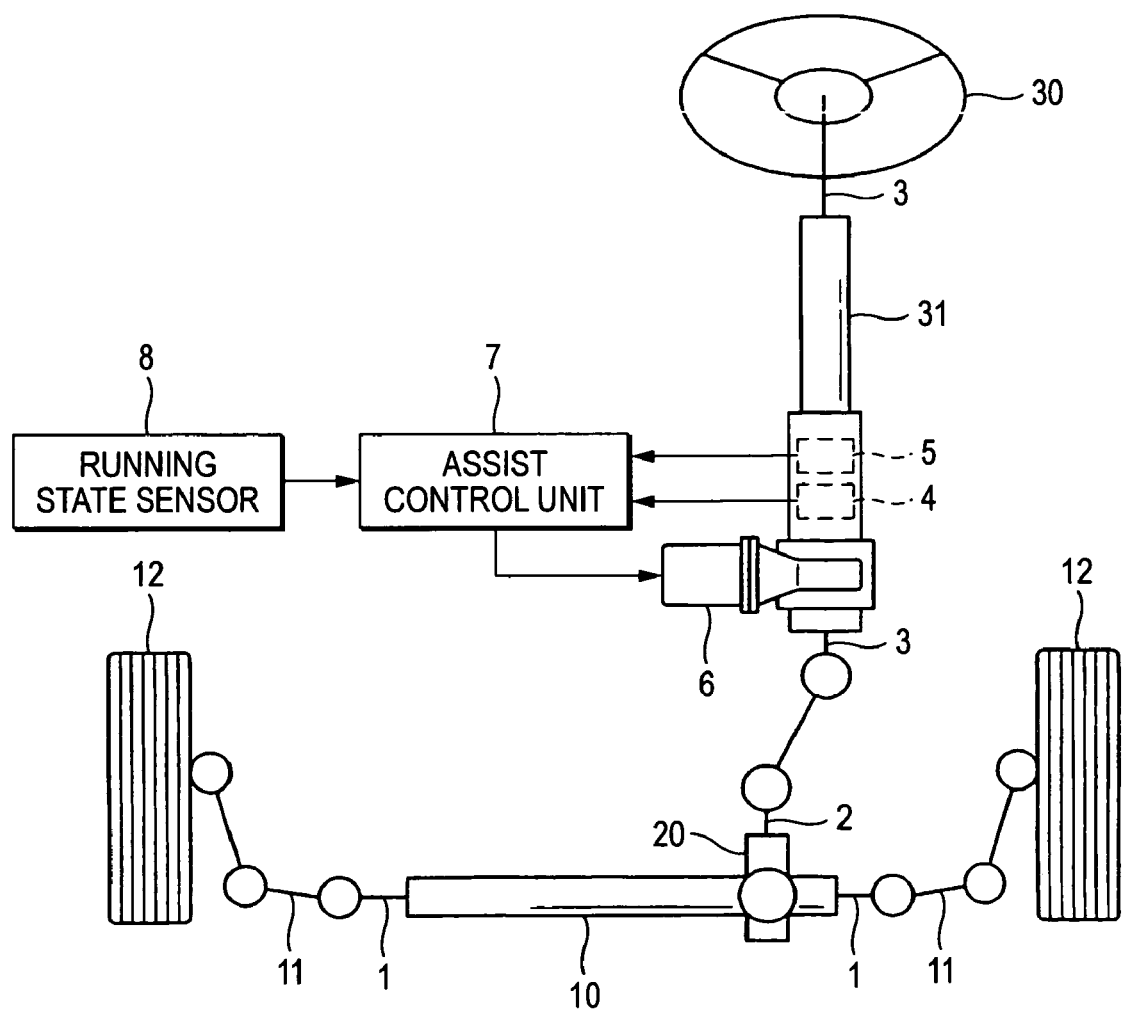
FIG. 1 is an exemplary diagram which shows the configuration of an electric power steering system according to the invention.

Hereinafter, the invention will be described in detail based on the drawings which illustrate an embodiment thereof. FIG. 1 is an exemplary diagram which shows the configuration of an electric power steering system according to the invention. In the figure, while an example is shown in which the invention is applied to a vehicle equipped with a rack-and-pinion steering mechanism, it is needless to say that the invention can be applied to vehicles equipped with other types of steering mechanisms including a ball screw type steering mechanism.

A rack-and-pinion steering mechanism has the known configuration in which the mechanism is made up of a rack shaft 1 which is supported in such a manner as to freely move in a longitudinal direction thereof in an interior of a rack housing 10 provided to extend in a transverse direction of a vehicle body, not shown, and a pinion shaft 2 which is supported in such a manner as to freely rotate in an interior of a pinion housing 20 which intersects an intermediate position of the rack housing 10 at right angles, in which ends of the rack shaft 1, which protrude outside the rack housing 10 from ends thereof, respectively, are connected, respectively, to left and right steering road wheels (generally, front road wheels) 12, 12 via corresponding tie rods, and in which an upper end of the pinion shaft 2 which protrudes outside the pinion housing 20 is connected to a steering wheel 30 as a steering member via a steering shaft 3.

A pinion, not shown, is formed at a lower portion of the pinion shaft 2 which extends into the interior of the pinion housing 20, and the pinion is brought into mesh engagement with rack teeth which are formed on an external surface of the rack shaft 1 over an appropriate length at the intersecting portion with the rack housing 10. In addition, the steering shaft 3 is supported rotatably in an interior of a column housing 31 which is formed into a cylindrical shape and is fixed to an interior of a passenger compartment via the column housing 31 while maintaining its inclined posture with its front lowered. In addition, the pinion shaft 2 is connected to a protruding end of the steering shaft 3 which protrudes downwards from the column housing 31, and the steering wheel 30 is provided in such a manner as to be coaxially fixed to a protruding end of the steering shaft 3 which protrudes upwards from the column housing 31.

By this configuration, when the steering wheel 30 is operated to be turned to steer the vehicle, the resultant rotation is transmitted to the pinion shaft 2 via the steering shaft 3, and the rotation of the pinion shaft 2 is then converted to longitudinal movement of the rack shaft 1 at the meshing portion between the pinion and the rack teeth, whereby the left and right steering road wheels 12, 12 are pushed and pulled by virtue of this longitudinal movement via the corresponding tie rods to be turned for steering.

Furthermore, primary and secondary torque sensors (a main torque sensor 4 and a sub-torque sensor 5) are provided in parallel at an intermediate portion of the column housing 31 which supports the steering shaft 3 for detecting a steering torque applied to the steering shaft 3 by virtue of the rotational operation of the steering wheel 30, and a steering assist motor 6 is mounted on the column housing 31 at a lower position than where the sensors are provided.

The main torque sensor 4 and the sub-torque sensor 5 are configured to detect via an appropriate device a relative angular displacement that is generated between two shafts, which results by vertically dividing the steering shaft 3 which constitutes a target for detection and which are connected coaxially to each other by a torsion bar whose characteristics are known, in conjunction with twisting of the torsion bar resulting from application of the steering torque.

Torque sensors of this type are put to practical use in various ways by modifying the configuration of the aforesaid displacement detecting sensor, and the main torque sensor 4 and the sub-torque sensor 5 have the same detecting device and are constructed to obtain the same output (detected torque value) basically in accordance with a relative angular displacement of the two shafts generated by the application of steering torque.

In addition, the steering assist motor 6 is mounted on an outside of the column housing 31 with its axial center made to intersect the column housing 31 substantially at right angles and is configured, for example, such that a worm secured to an output end thereof which extends into the interior of the column housing 31 is brought into mesh engagement with a worm wheel fixedly fitted on the steering shaft 3, so that the rotation of the motor 6 is transmitted to the steering shaft 3 while being reduced in speed by the worm and the worm wheel. According to this configuration, the rotation of the steering assist motor 6 is transmitted to the steering shaft 3 while being reduced in speed, and the rotating force is imparted to the pinion shaft 2 which is provided continuously to the lower end of the steering shaft 3, whereby the steering that is carried out as described above is assisted in accordance with this rotation.

Note that the mounting position of the steering assist motor 6 is not limited to the position shown in the figure, and the steering assist motor 6 can be mounted at any appropriate position in such a manner as to transmit its rotation to the steering shaft 3, the pinion shaft 1 or the rack shaft 1 as long as the motor is mounted below the primary and secondary torque sensors 4, 5. When the steering assist motor 6 is constructed so as to transmit its rotation to the rack shaft 1, it is needless to say that a movement converting device is necessary which converts the rotation of the motor 6 to the longitudinal movement of the rack shaft 1.

The steering assist motor 6 is driven by an operation command that is imparted thereto from an assist control unit 7 via a drive circuit, not shown. Detected torque values detected by the main torque sensor 4 and the sub-torque sensor 5 are given to the assist control unit 7 as inputs, and detection results on the running state which affect the steering such as vehicle speed, lateral acceleration, yaw rate and the like are also imparted to the assist control unit 7 from running state sensors 8 which are arranged at various portions of the vehicle.

The assist control unit 7 performs an assist control operation in such a way to calculate a steering torque applied to the steering shaft 3 by using a detected torque value detected by the main torque sensor 4, apply the calculation result to a control map to determine on a necessary steering assist force and send out an operation command to the motor 6 to generate the steering assist force so determined. A plurality of control maps are prepared in accordance with vehicle speeds and are selected for use based on a detection result on vehicle speed that is imparted from the running state sensor 8. In addition, the lateral acceleration and yaw rate are used to correct the determined steering assist force. Note that various proposals have been made heretofore as to the assist control operation like this, and the assist control unit 7 can implement these assist control operations appropriately.

A detected torque detected by the sub-torque sensor 5 is used to determine on failure of the main torque sensor 4. The feature of the electric power steering system according to the invention resides in this failure determination operation, or, to be more specific, a setting procedure of a threshold value used for failure determination. Hereinafter, this threshold setting procedure will be described.

Figure 2:
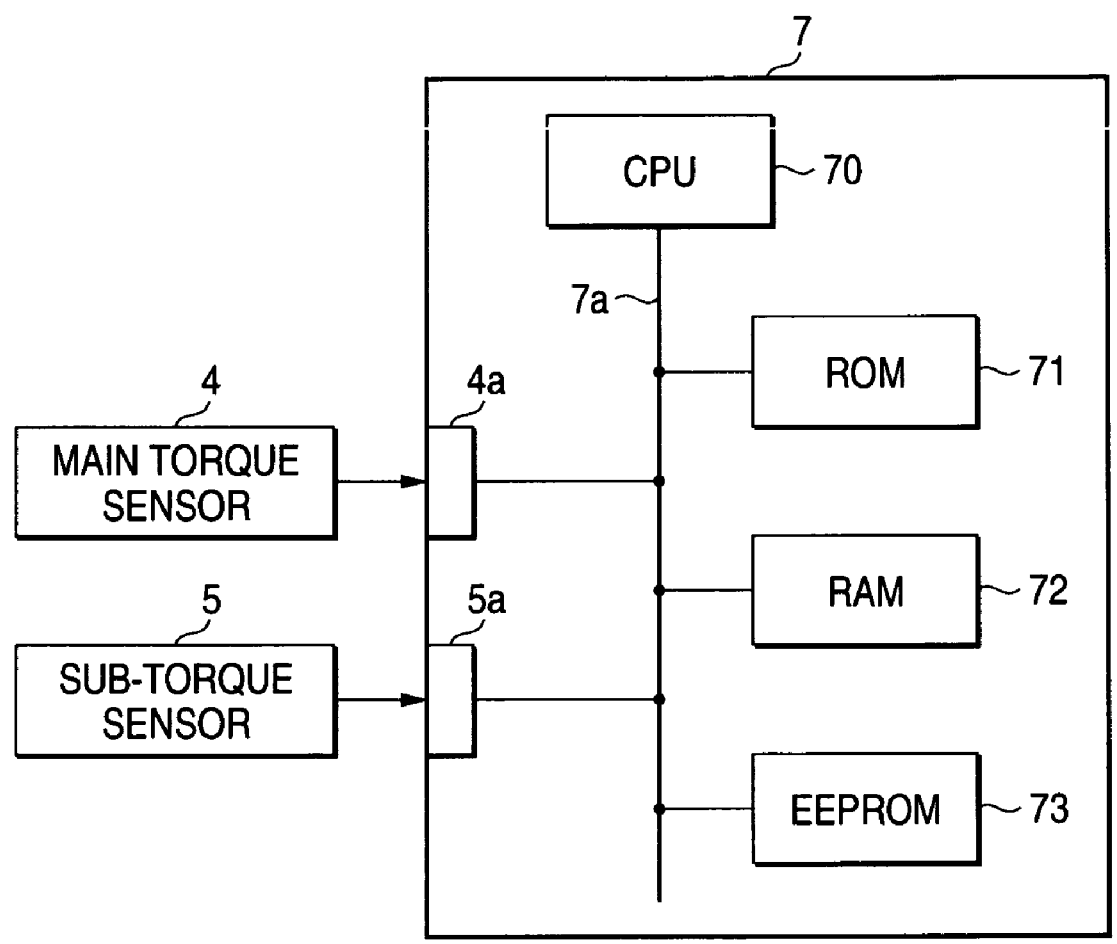
FIG. 2 is a block diagram of an assist control unit.

FIG. 2 is a block diagram of the assist control unit 7. The assist control unit 7 includes a CPU 70, a ROM 71 and a RAM 72 which are connected to each other by an internal bus 7*a* and is configured as an ECU which executes the above assist control operation by operation of the CPU 70 which follows a control procedure stored in the ROM 71, including an EEPROM 73 which stores various constants used for the assist control operation and the following correction values which are used for the failure determination operation, the constants and the correction values being written from the outside. Detected torque values detected by the main torque sensor 4 and the sub-torque sensor 5 are inputted into the assist control unit 7 via input interfaces 4*a*, 5*a*.

Figure 3:
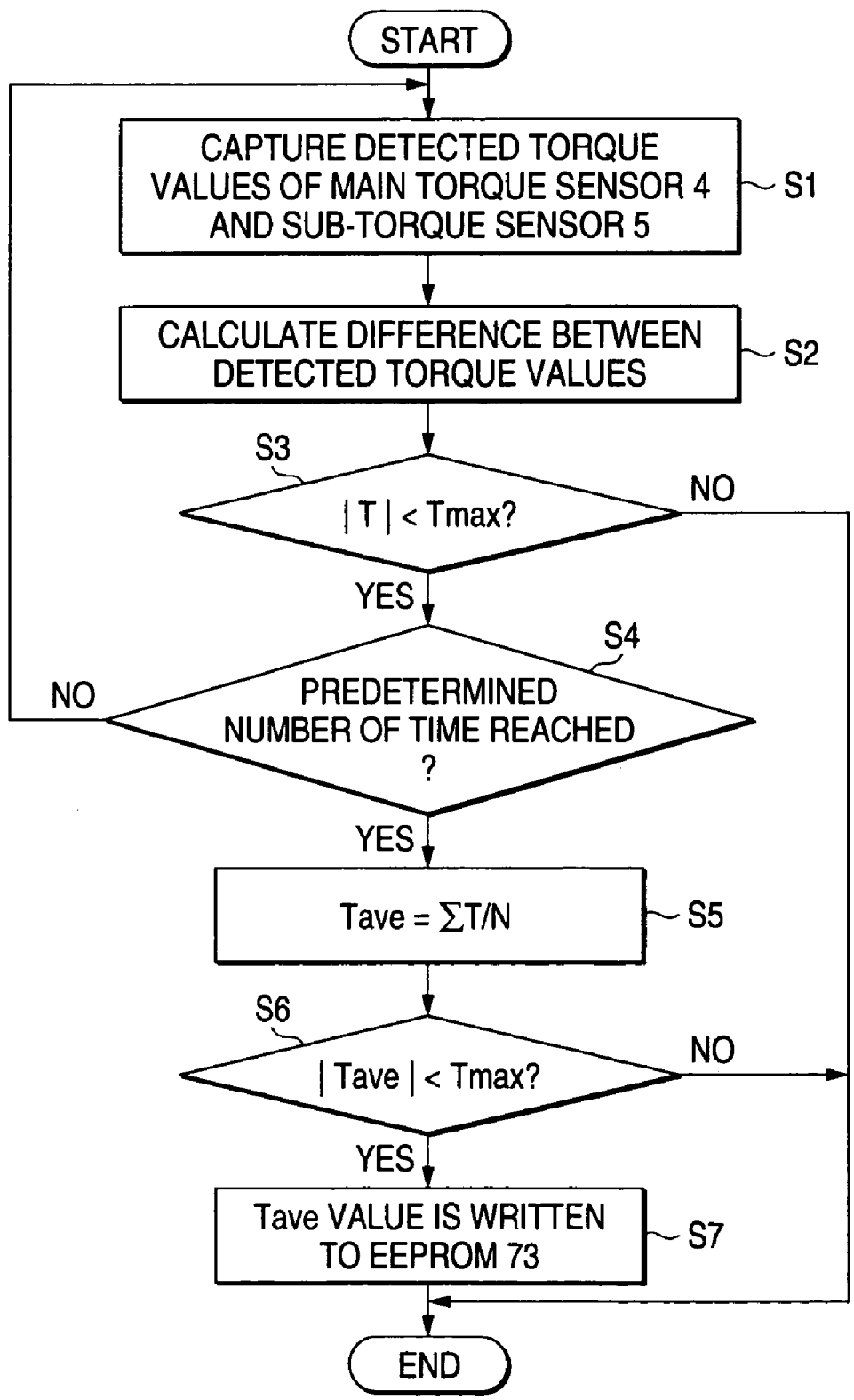
FIG. 3 is a flowchart which shows a procedure of a determination process of a threshold value for use in setting a threshold value.

FIG. 3 is a flowchart which shows a determination process procedure of correction values used to set a threshold value. This process is implemented in such a state that a predetermined steering torque (including zero) is applied to the power steering system in an inspection process carried out after the completion of assembly of the main torque 4 and the sub-torque sensor 5. Firstly, detected torque values of the main torque sensor 4 and the sub-torque control sensor 5 are captured (step S1), and a difference T between the detected torque values is calculated (step S2). Next, an absolute value |T| of the torque difference so calculated is compared to a preset upper limit difference $T_{max}$ (>0) (step S3), and if the absolute value |T| of the torque difference T is equal to or larger than $T_{max}$, the detected torque values captured in step S1 are determined to be abnormal, the process being ended without proceeding to the following steps.

As has been described above, the main torque sensor 4 and the sub-torque sensor 5 are torque sensors having the same configuration, and hence, when applied with a common test torque, detected torque values detected by them should be the same by nature. However, an individual difference is generated in each of actual detected torque values detected by the respective sensors due to effects of dimension errors of constituent components and assembly errors of the respective sensors. While the setting of a threshold according to the invention is performed to offset the individual differences in the detected torque values which are generated in the aforesaid manner, the individual differences are not large. The comparison in step S3 is performed to eliminate an erroneous detected value caused by other factors such as effect of disturbance noise and failure of the main torque sensor 4 or the sub-torque sensor 5 than the aforesaid dimension error and assembly error.

The upper limit difference $T_{max}$ used for comparison in step S3 is set in advance as an upper limit value of a torque difference that is considered to be generated by the effects of the dimension error and the assembly error, and if the absolute value |T| of the current torque difference T is determined to be equal to or larger than the upper limit difference $T_{max}$ in the comparison in step S3 (S3: NO), it can be determined that the absolute value |T| of the current torque difference T is not such as to result from the individual differences. Note that in the event that the process is ended as a result of determination in step S3, it is desirable that the worker is informed of a failure in correction value setting by, for example, illuminating a lamp or producing a signal sound so as to run another test or seek for a cause of the failure.

On the other hand, in the event that the determination in step S3 determines that the absolute value |T| of the current torque difference T is less than the upper limit difference $T_{max}$ (S3:YES), next, whether or not the number of times of calculation of torque difference has reached a predetermined number of times (N times) which is set in advance (step S4), if the predetermined number of times has not yet been reached (S4: NO), then, returning to step S1, the capture of detected torque values and calculation of torque difference T are repeated. On the contrary, if the predetermined number of times is determined to have been reached and a predetermined number (N) of calculated values of the absolute value |T| of the current torque difference T which is less than the upper limit difference $T_{max}$ are obtained (S4:YES), next, an average value $T_{ave}$ of those torque differences T is calculated (step S5), an absolute value |$T_{ave}$| of the average value so calculated is compared to the upper limit difference $T_{max}$ (step S6), in the event that the absolute value |$T_{ave}$| of the average value is less than the upper limit difference $T_{max}$ (S6: YES), the average value $T_{ave}$ is determined as a correction value and is written to the EEPROM 73 (step S7), and the series of correction value determination steps is ended.

Thus, since the calculation of the absolute value |T| of the torque difference T is repeated a plurality of number of times to operate an average value $T_{ave}$ of calculated values so obtained, a minute error component contained in a detected torque value detected each time is offset, and the average value $T_{ave}$ comes to accurately correspond to an actual difference in detected torque values which is generated between the main torque sensor 4 and the sub-torque sensor 5 as a result of the dimension error and the assembly error.

The comparison of the upper limit difference $T_{max}$ to the absolute value |$T_{ave}$| of the average value $T_{ave}$ in step S6 is such as to be performed to correct the occurrence of an error in operating the average value $T_{ave}$ in step S5, and if the absolute value |$T_{ave}$| of the average value $T_{ave}$ is determined to be equal to or larger than $T_{max}$ (S6: NO), the process is ended without writing the average value $T_{ave}$ so calculated as a correction value. In this case, too, it is desirable that the worker is to be informed of the fact via an appropriate informing means so as to carry out another test or seek for a cause of the failure.

The writing of the correction value to the EEPROM 73 in step S7 is carried out in a plurality of number of times in different wiring modes. For example, the average value Tave can be written in three ways with its value as it is, an odd bit inverted value and an even bit, whereby an error in writing process can be compensated for.

Figure 4:
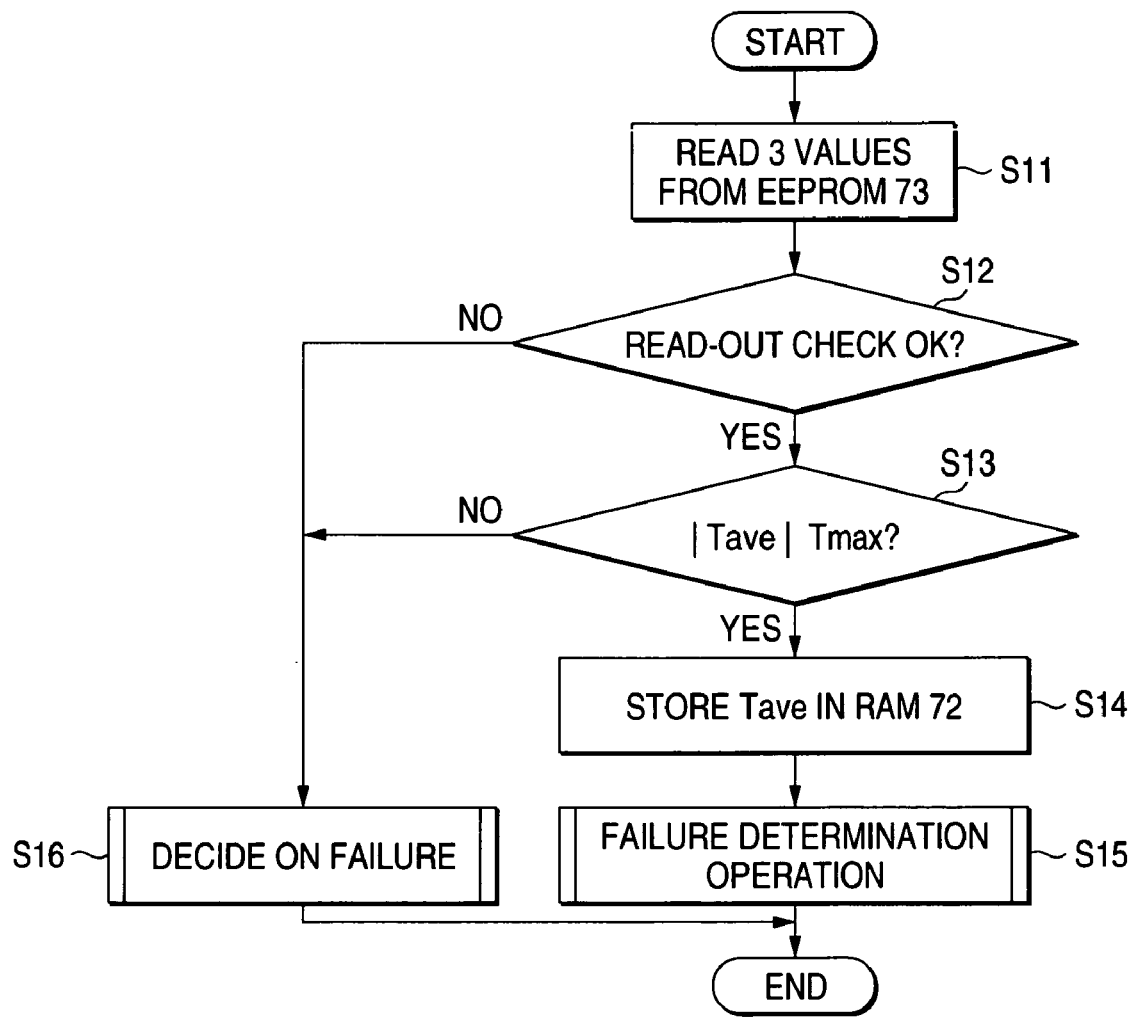
FIG. 4 is a flowchart which shows a procedure of a failure determination operation.

FIG. 4 is a flowchart which shows a procedure of the failure determination operation. This failure determination process is triggered to be initiated by activation of the assist control unit 7 which is configured as the ECU in response to a power supply initiated by operation for the ignition key to be turned to the ON position, and firstly, the CPU 70 reads in the average value $T_{ave}$ (the correction value) stored in the EEPROM 73 (step S11) and goes on to carry out a read-out check (step S12).

The reading in of the average value $T_{ave}$ in step S11 is carried out on the three values stored in the EEPROM 73. The read-out check in step S12 is a process to check whether or not the three values so read in coincide with each other, and if they do not coincide (S12: NO), it is determined that a read-in error has occurred, and, proceeding to step S16, a failure decision process is performed.

If no problem is determined in the read-out check in step S12 (S12: YES), next, the absolute value $|T_{ave}|$ of the average value $T_{ave}$ so read in is compared to the upper limit difference $T_{max}$ (step S13), and if the absolute value $|T_{ave}|$ is determined to be equal to or larger than $T_{max}$ from the comparison (s13: NO), it is also determined that a read-in error has occurred, and, proceeding to step S16, a failure decision process is performed. The determination made in step S13 is such as to be necessary when errors occur in reading in all the three values, whereby setting of erroneous threshold values attributed to such read-in errors can be prevented by the determinations made in step S12 and step S13.

Note that the failure decision process carried out in step S16 is an operation to prohibit the setting of a threshold value, which will be described below, and the execution of a failure determination operation based on the threshold value that would otherwise be set, and it is desirable to prohibit the assist control operation at the same time. In addition, in this failure determination operation, it is desirable to inform the driver by some means such as an illuminated lamp and signal sound of the fact that the steering assist cannot be performed. Furthermore, in step S12, if the two values of the three coincide with each other, those two coinciding values are adopted on the principle of decision by majority for execution of the following steps.

If the determinations made in steps S12 and S13 are passed, determining that the average value $T_{ave}$ so read in is a correct value, the average value $T_{ave}$ is stored in the RAM 72 as a correction value (step S14), and the failure determination operation is initiated (step S15). The failure determination operation is a known operation in which detected torque values of the main torque sensor 4 and the sub-torque sensor 5 are captured in an appropriate sampling cycle, the main torque sensor 4 is determined to be in a failed state when the absolute value of a difference of the detected torque values so captured exceeds the preset threshold value (>0), and the assist control that is carried out as described above using the detected torque value of the main torque sensor 4 is prohibited, and the operation is repeatedly executed in parallel with the assist control operation in order to prevent the generation of unstable steering attributed to the erroneous assist control.

In the failure determination operation, the CPU 70 corrects for use the threshold value used for the failure determination process using the correction value stored in the RAM 72. A most simple form of the correction is performed by adding the correction value ($T_{ave}$) to the preset threshold value. This correction value accurately corresponds to the actual difference that is generated between the detected torque value of the main torque sensor 4 and the detected torque value of the sub-torque sensor 5 as a result of dimension error and assembly error, and by using the threshold value which is corrected with such a correction value, the failure determination of the main torque sensor 4 can be carried out with high accuracy.

Note that the correction of the threshold value can appropriately be carried out, for example, by making a value resulting when multiplying the correction value ($T_{ave}$) by a predetermined gain be a threshold value.

What is claimed is:

1. An electric power steering system comprising:
primary and secondary torque sensors for detecting a steering torque applied to a steering member;
a difference calculator that calculates a difference between detected torque values detected by the primary and secondary torque sensors a predetermined number of times in such a state that a predetermined steering toque is applied;
an average value calculator that calculates an average value of results of calculations made by the difference calculator;
a threshold value corrector that corrects a threshold value based on the average value calculated by the average value calculator; and
a failure determining unit that performs a failure determining operation for determining whether or not the primary torque sensor fails based on a result of a comparison between a difference between detected torque values detected by the primary and secondary torque sensors and the corrected threshold value is performed during an assist control operation in which a steering assist motor is controlled to be driven based on a detected torque value detected by the primary torque sensor.

2. The electric power steering system according to claim 1, further comprising a storage that stores a plurality of values which are written in different modes which, respectively, represent an average value calculated by the average value calculator, wherein the threshold value corrector corrects the threshold value based on the stored values read out of the storage.

3. The electric power steering system according to claim 2, wherein when the plurality of values in different modes read out of the storage represent different average values, the failure determining unit does not perform the failure determining operation.

* * * * *